US012097503B2

(12) United States Patent
Shelley et al.

(10) Patent No.: US 12,097,503 B2
(45) Date of Patent: Sep. 24, 2024

(54) GRINDING MEDIA, SYSTEM AND METHOD FOR OPTIMISING COMMINUTION CIRCUIT

(71) Applicant: Moly-Cop USA LLC, Kansas City, MO (US)

(72) Inventors: Paul Shelley, Bassendean (AU); John Mullholland, Bassendean (AU); Ian Hamilton, Bassendean (AU)

(73) Assignee: Moly-Cop USA LLC, Kansas City, MO (US)

( * ) Notice: Subject to any disclaimer, the term of this patent is extended or adjusted under 35 U.S.C. 154(b) by 785 days.

(21) Appl. No.: 17/050,765

(22) PCT Filed: Apr. 4, 2019

(86) PCT No.: PCT/AU2019/050376
§ 371 (c)(1),
(2) Date: Oct. 26, 2020

(87) PCT Pub. No.: WO2019/204882
PCT Pub. Date: Oct. 31, 2019

(65) Prior Publication Data

US 2021/0237094 A1 Aug. 5, 2021

(30) Foreign Application Priority Data

Apr. 26, 2018 (AU) ................................ 2018901388

(51) Int. Cl.
*B02C 17/20* (2006.01)
*B02C 17/18* (2006.01)
*B02C 25/00* (2006.01)

(52) U.S. Cl.
CPC .......... *B02C 17/1805* (2013.01); *B02C 17/20* (2013.01); *B02C 17/205* (2013.01); *B02C 25/00* (2013.01); *B02C 2210/01* (2013.01)

(58) Field of Classification Search
CPC ... B02C 17/20; B02C 17/205; B02C 17/1805; B02C 25/00; B02C 17/185
See application file for complete search history.

(56) References Cited

U.S. PATENT DOCUMENTS 4,722,485 A * 2/1988 Young ..................... B02C 25/00 241/34
5,360,174 A * 11/1994 Persson ................ B02C 17/205 73/862.634

(Continued)

FOREIGN PATENT DOCUMENTS

CL 2010000402 A1 7/2010
CL 201503741 12/2015

(Continued)

OTHER PUBLICATIONS

International Search Report in related application PCT/AU2019/050376, dated Jul. 16, 2019, 19 Pages.

(Continued)

*Primary Examiner* — Faye Francis
(74) *Attorney, Agent, or Firm* — Shook, Hardy & Bacon L.L.P.

(57) ABSTRACT

A grinding media adapted to measure one or more physical characteristics of a comminution apparatus during operation or a charge therein is disclosed. The grinding media includes a freely moving grinding body with a bore disposed in an outer body portion of the body. A sensor body is configured to be received in the bore. The sensor body comprises a rigid sleeve, a resilient core and a sensor array embedded in the core of resilient material. A system for optimizing performance of a comminution circuit is also disclosed. The system includes a comminution apparatus varied in response to one or more physical characteristics of the comminution apparatus or the charge contained therein, measured during operation of the comminution apparatus. The system com- (Continued)

prises a plurality of the adapted to measure grinding media. A method of optimizing performance of a comminution circuit is also disclosed.

20 Claims, 12 Drawing Sheets

(56) References Cited

U.S. PATENT DOCUMENTS

| | | | | |
|---|---|---|---|---|
| 8,230,738 | B2 * | 7/2012 | Radziszewski | H04Q 9/00 73/489 |
| 8,366,029 | B2 * | 2/2013 | Becker | B02C 17/1805 241/35 |
| 9,321,054 | B2 * | 4/2016 | Held | B02C 11/00 |
| 9,429,559 | B2 * | 8/2016 | Radjy | G01N 33/383 |
| 9,849,460 | B2 * | 12/2017 | Sepulveda Villalobos | G01K 13/00 |
| 10,653,027 | B2 * | 5/2020 | van Pol | G01D 11/245 |
| 2002/0002577 | A1 | 1/2002 | Garg et al. | |
| 2002/0175232 | A1 * | 11/2002 | Scuccato | B02C 17/1805 241/301 |
| 2003/0227394 | A1 * | 12/2003 | Rothgeb | A47L 15/4297 340/870.01 |
| 2006/0138258 | A1 * | 6/2006 | Jarvinen | B02C 17/1805 241/30 |
| 2010/0024518 | A1 | 2/2010 | Radziszewski et al. | |
| 2010/0237175 | A1 * | 9/2010 | Becker | B02C 25/00 241/36 |
| 2016/0018383 | A1 | 1/2016 | Radjy | |
| 2018/0313707 | A1 * | 11/2018 | Schumacher | E21D 21/02 |
| 2020/0209128 | A1 * | 7/2020 | Bustos Robledo | G01B 17/02 |
| 2021/0069720 | A1 * | 3/2021 | Steed | B02C 17/22 |

FOREIGN PATENT DOCUMENTS

| | | |
|---|---|---|
| CN | 104713356 A | 6/2015 |
| CN | 104713556 A | 6/2015 |
| CN | 104764450 A | 7/2015 |
| CN | 204694262 U | 10/2015 |

OTHER PUBLICATIONS

Decision to Grant received for Russian Patent Application No. 2020138035, dated May 6, 2022, 17 pages. (English Translation Submitted).

Canadian Office Action received for Canadian Patent Application No. 3,098,317, dated Nov. 20, 2020, 3 pages.

Notice of Acceptance received for Australian Patent Application No. 2019258603, dated Oct. 9, 2021, 3 pages.

Office Action and Search Report received for Russian Patent Application No. 2020138035, dated Dec. 10, 2021, 16 pages. (English Translation Submitted).

First Office Action received for Indonesian Patent Application No. P00202008734, dated Dec. 27, 2021, 9 pages.(English Translation Submitted).

Extended European Search Report and Opinion received for European Patent Application No. 19793839.2, dated Jan. 11, 2022, 7 pages.

Technical Report received for Peruvian Patent Application No. 1687-2020, dated Nov. 24, 2022, 11 pages. (English translation submitted).

First Examination Report received for Australian Patent Application No. 2019258603, dated Feb. 3, 2021, 3 pages.

Notice of Allowance received for Indonesian Patent Application No. P00202008734, dated May 2, 2023, 4 pages. (English Translation Submitted).

* cited by examiner

GRINDING MEDIA, SYSTEM AND METHOD FOR OPTIMISING COMMINUTION CIRCUIT

CROSS-REFERENCE TO RELATED APPLICATIONS

This application claims priority under 35 U.S.C. § 365 to PCT/AU2019/050376, filed on Apr. 26, 2019, entitled "GRINDING MEDIA, SYSTEM AND METHOD FOR OPTIMISING COMMINUTION CIRCUIT," which claims priority to Australian App. No. 2018901388, filed on Apr. 26, 2018, the entirety of the aforementioned applications are incorporated by reference herein.

TECHNICAL FIELD

The present disclosure relates to a grinding media adapted to measure one or more physical characteristics of a comminution apparatus during operation and/or a charge contained therein. In particular, the present disclosure relates to a freely moving grinding media adapted to measure, collect and transmit one or more physical characteristics of a comminution apparatus and/or a charge contained therein during a comminution process.

The present disclosure also relates to a method and system of optimising a comminution circuit using said grinding media.

BACKGROUND

The following discussion of the background to the disclosure is intended to facilitate an understanding of the embodiments described herein. However, it should be appreciated that the discussion is not an acknowledgement or admission that any of the material referred to was published, known or part of the common general knowledge as at the priority date of the application.

In an ore body, most of the mineral fraction is very finely disseminated or associated with a waste materials ('gangue') fraction. Comminution is the process whereby the particle size of the ore is progressively reduced until the clean particles of the mineral of interest are 'liberated' from the gangue matrix within the rock and can be separated through physical or other means. In a mineral processing plant comminution takes place in a sequence of crushing and grinding operations.

Crushing reduces the size of run-of-mine ore to sizes that a grinding mill can further reduce until the mineral and gangue are substantially produced as separate particles.

Grinding is accomplished by impact and abrasion of the ore by the free motion of freely moving grinding media such as rods, balls, or pebbles. Typically, grinding is accomplished over several stages, for instance commencing with a rod or semi-autogenous (SAG) mill, followed by a ball mill and optionally a re-grind mill. In between the milling processes, classification devices (e.g. screen, hydrocyclone) are used to separate smaller particles from the bigger ones.

A SAG mill is typically provided with a high aspect ratio and utilizes steel balls in addition to large rocks for ore grinding. It rotates, tumbling its contents, thereby causing particle breakage through steel ball impact over the ore and ore to ore attrition. The mill is equipped with a liner which is made of wear resistant steel and fitted with lifters, which assist in raising the load as the mill rotates. The mill load consists of dry ore, steel balls, and water, which occupies 30-35% of the volume. The mill chute is continuously fed with fresh ore and it is crushed until it is small enough to pass through the discharge grates.

Ball mills, on the other hand, have a low aspect ratio and only deploy steel balls for ore grinding. Ball mills typically take small particles (for example below 1 mm) as feed and grind them to an effective size (generally below 200 μm) for mineral liberation in the separation stages. Similar to a SAG mill, ball mills also have a wear resistant liner and lifter that tumbles the steel balls and slurry inside the mill.

Rod mills are very similar to ball mills, except that they use long rods for grinding media. The rods grind the ore by tumbling within the mill, similar to the grinding balls in a ball mill. Rod mills accept feed up to about 50 mm and produce a product in the size range of 3 to 0.5 mm. Grinding action is by line contact between the rods extending the length of the mill. Rods tumble and spin in roughly parallel alignment simulating a series of roll crushers. This results in preferential grinding of coarse material and minimises the production of slimes.

In view of the variability of material in the ore body, operators typically run the mills at maximum power in the hope of maximising throughput.

Consequently, comminution can be responsible for up to 30% of the cost of metal production and up to about 50% of energy consumption. For example, in gold and copper producing mines, the proportion of energy consumed through crushing and grinding processes is between 26 and 53 percent of total energy used by the plant. Research indicates that comminution represents up to two percent of world electrical power consumption.

An optimised grinding operation would be a prerequisite for an energy efficient particle breakage system and the mining industry currently uses a steady-state simulator embedded with predictive models. However, in practice it is difficult to maintain steady state conditions in the milling operation and therefore the simulated predictive models are not an accurate representation of mill conditions. A real-time data monitoring and simulator embedded with dynamic models would enable operators to reduce their power consumption and identify the suitable conditions for milling operation.

Therefore there is a need for a real time data gathering system that collects data from inside the grinding mill, responds to the change in milling condition, identifies energy efficient conditions for milling operations and optimises grinding operations by ensuring target product size and throughput.

Data relating to slurry temperature, grinding media disturbance (rod scissoring or ball rolling), impact and abrasion force and grinding media positioning inside the Rod, SAG and ball mill would provide a better understanding about the mill dynamics, reduce grinding energy and water consumption (wastage) and help to optimise the process. Accurate recording of these data is only possible by placing sensors inside the mill and measuring the true values in real time.

However, the problem of real-time measurement from within the mill and then utilizing the collected data to increase the efficiency of the comminution process remains a challenge.

US Patent Application Publication No. 20100024518 describes an instrumental ball for collecting data within an industrial mill. The device has a casing of resilient material which houses a sensor package in a cavity therein. The sensor package detects and samples various physical parameters, such as acceleration and rate of change of attitude of the object on an ongoing basis. The device is configured to transmit data in real time via an antenna to an external device.

The environment within the mill during operation, however, is particularly harsh and inherently destructive. It is a challenge to ensure the media carrying the instrumentation has a sufficient lifespan to enable measurement over the period approximating the normal life of the media (without instrumentation) in a cost effective manner.

The present invention seeks to overcome at least some of the aforementioned disadvantages.

SUMMARY

The present disclosure relates to a grinding media adapted to measure one or more physical characteristics of a comminution apparatus during operation or a charge contained therein. In particular, the present disclosure relates to a freely moving grinding media adapted to measure, collect and transmit one or more physical characteristics of a comminution apparatus and/or a charge contained therein during a comminution process.

The present disclosure also relates to a method and system of optimising a comminution circuit using said grinding media.

In one aspect of the disclosure there is provided a freely moving grinding media adapted to measure one or more physical characteristics of a comminution apparatus during operation or a charge contained therein, said grinding media comprising a freely moving grinding body with a bore disposed in an outer portion of said body and a sensor body configured to be received in the bore, wherein the sensor body comprises a rigid sleeve, a resilient core and a sensor array embedded in the core of resilient material.

In one embodiment, the sensor array may be disposed proximal a base of the sensor body. The sensor array may be provided with an antennae extending from the sensor array through the resilient core to an upper surface of the sensor body.

In some embodiments, the sensor array may be provided with a resilient housing.

In various embodiments, the resilient core may comprise a first resilient material and the resilient housing may comprise a second resilient material. The first and second resilient materials may be the same or different. The resilient core may be capable of distributing forces applied to the sensor body to said grinding body, thereby disseminating at least some of said forces away from the sensor array.

In one embodiment, the freely moving grinding body may comprise a grinding rod having opposing ends. In this particular embodiment, the bore may be co-axially disposed in one or each opposing end.

In an alternative embodiment, the freely moving grinding body may comprise a grinding ball. In this particular embodiment, the bore may be radially aligned with a centre of the grinding ball. In some forms of this embodiment, the bore may extend to a centre of the grinding ball.

In a still further embodiment, the freely moving grinding body may comprise a sample of a charge for the comminution apparatus. For example, said sample may be a representative sample of ore that is to be milled in the comminution apparatus.

In the various embodiments of the freely moving grinding media defined above, the sensor array may comprise one or more sensors arranged to respectively measure one or more physical characteristics of the charge contained within the comminution apparatus, the one or more physical characteristics being selected from a group comprising temperature, impact, impact frequency, impact velocity, impact force, disturbance, trajectory, charge volume, toe and shoulder of charge, and so forth. The term "toe and shoulder of charge" as used herein refers to the angle between the charge body and the charge trajectory.

Alternatively, or additionally, the sensor array may comprise one or more sensors arranged to respectively measure one or more physical characteristics of the comminution apparatus, the one or more physical characteristics being selected from a group comprising lifter angle, lifter wear, temperature, rod tilt or scissoring, mill speed, energy efficiency, vibration amplitude and/or frequency, dynamic loading on a liner bolt, liner bolt torque/tension, and so forth.

In an alternative aspect, the sensor device may comprise a fixed body externally protruding from a comminution apparatus, the fixed body being provided with a mounting plate, and a sensor array mounted on the mounting plate.

In particular, the fixed body may be a liner bolt externally protruding from a mill shell of the comminution apparatus.

In another aspect, the present disclosure also relates to a system of optimising performance of a comminution circuit comprising a comminution apparatus in response to one or more physical characteristics of the comminution apparatus or the charge contained therein measured during operation of the comminution apparatus, the system comprising:

a plurality of freely moving grinding media as defined above, arranged in use to be mixed with an ore or other material in need of comminution and a grinding media and charged to the comminution apparatus, whereby, in use, the plurality of freely moving grinding media collect data corresponding to one or more physical characteristics of the comminution apparatus or the charge contained therein during operation of the comminution apparatus;

a processing module arranged to receive collected data from the plurality of freely moving grinding media to conduct a real time analysis of the operation of the comminution apparatus in the comminution circuit; and an optimisation system arranged to monitor and report on one or more performance characteristics of the comminution circuit while the comminution circuit is operating in accordance with a process model, the optimisation system being further arranged to vary one or more process parameters in accordance with the real time analysis provided by the processing module to improve the performance of the comminution circuit and thereby update the process model.

In one embodiment, the optimisation system is arranged to generate a set of optimised process parameters to optimise the one or more performance characteristics of the comminution circuit.

In one embodiment, the one or more process parameters may be manually varied by an operator In another embodiment, the optimisation system may be arranged to vary the one or more process parameters in accordance with said real time analysis in real time or near real time.

In another embodiment, the optimisation system may be arranged to vary the one or more process parameters in accordance with said real time analysis to obtain optimised performance of the comminution circuit.

In another aspect, the present disclosure also relates to a method of optimising performance of a comminution circuit comprising a comminution apparatus in response to one or more physical characteristics of the comminution apparatus or the charge contained therein measured during operation of the comminution apparatus, the method comprising:

charging a comminution apparatus with a charge and a plurality of freely moving grinding media as defined above;

operating the comminution apparatus to comminute the charge according to one or more process parameters, whereby the plurality of freely moving grinding media collect data corresponding to one or more physical characteristics of the comminution apparatus or the charge contained therein during operation;

receiving and processing the collected data to obtain a real time analysis of the operation of the comminution apparatus in the comminution circuit; and monitoring and reporting on one or more performance characteristics of the comminution circuit and, optionally, varying one or more process parameters in accordance with the real time analysis, thereby generating a set of optimised process parameters corresponding to the one or more process parameters to improve the performance of the comminution circuit.

In one embodiment, generating the set of optimised process parameters may be performed in real time or near real time in response to the real time analysis of the operation of the comminution circuit.

In one embodiment the charge comprises an ore or other material in need of comminution and a grinding media. The charge may comprise a slurry of the ore or said other material.

In one embodiment, each freely moving grinding media in the plurality of sensor devices may be arranged to collect data corresponding to a different physical characteristic.

In accordance with a third aspect of the present disclosure, there is provided a computer program comprising at least one instruction for controlling a computer system to implement a method as defined above.

In accordance with a fourth aspect of the present disclosure, there is provided a computer readable medium providing a computer program in accordance with the method as defined above.

In accordance with a fifth aspect of the present disclosure, there is provided a comminution circuit comprising a comminution apparatus and a system for optimising performance thereof as defined above.

BRIEF DESCRIPTION OF DRAWINGS

Embodiments of the disclosure will now be described by way of example with reference to the accompanying figures in which.

DESCRIPTION OF EMBODIMENTS

General Terms

Figure 1:
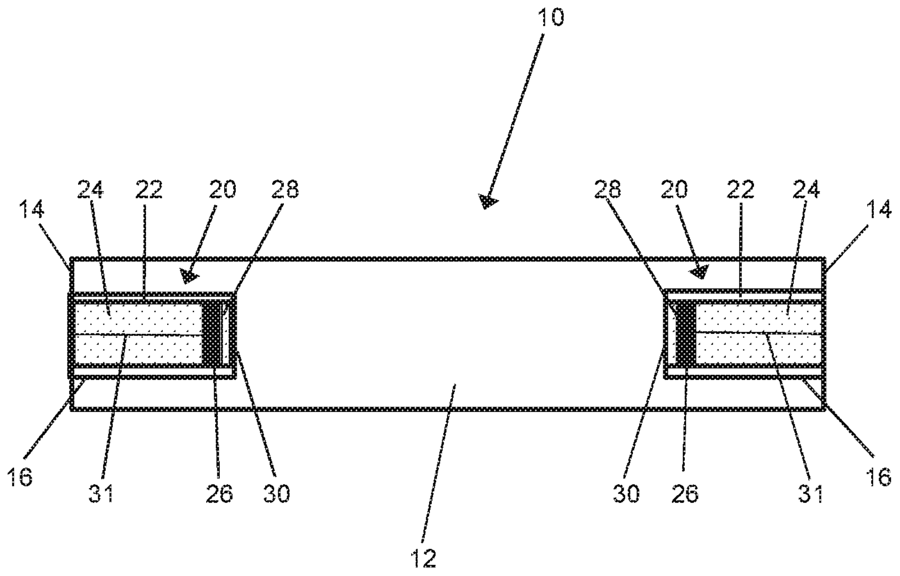
FIG. 1 is a cross-sectional view of a freely moving grinding media according to one embodiment as disclosed herein.

Throughout this specification, unless specifically stated otherwise or the context requires otherwise, reference to a single step, composition of matter, group of steps or group of compositions of matter shall be taken to encompass one and a plurality (i.e. one or more of those steps, compositions of matter, groups of steps or groups of compositions of matter. Thus, as used herein, the singular forms “a”, “an” and “the” include plural aspects unless the context clearly dictates otherwise. For example, reference to “a” includes a single as well as two or more; reference to “an” includes a single as well as two or more; reference to “the” includes a single as well as two or more and so forth.

The term “and/or” e.g., “X and/or Y” shall be understood to mean either “X and Y” or “X or Y” and shall be taken to provide explicit support for both meanings or for either meaning.

Throughout this specification the word “comprise”, or such variations such as “comprises” or “comprising”, will be understood to imply the inclusion of a stated element, integer or step, or group of elements, integers or steps, but not the exclusion of any other element, integer or step, or group of elements, integers or steps.

Unless otherwise defined, all technical and scientific terms used herein have the same meaning as commonly understood by one of ordinary skill in the art to which the contents of the present disclosure belongs. Although methods and materials similar or equivalent to those described herein can be used in the practice or testing of the present disclosure, suitable methods and materials are described below. In case of conflict, the present specification, including definitions, will control. In addition, the materials, and examples are illustrative only and do not intend to be limiting.

Freely Moving Grinding Media

The present disclosure describes a freely moving grinding media for measuring one or more physical characteristics of a comminution apparatus during operation or a charge contained therein. In particular, the present disclosure describes a freely moving grinding media adapted to measure, collect and transmit data corresponding to one or more physical characteristics of a comminution apparatus or a charge contained therein during a comminution process.

The term 'comminution' as used herein refers to the process of reducing the particle size of dry materials or slurries by three types of forces: compression, impact and attrition. The two primary comminution processes are (1) crushing where compression and impact forces are deployed to reduce the particle size of materials and (2) grinding where impact and attrition are the dominant forces acting on the particles.

A 'comminution apparatus' refers to equipment arranged for crushing or grinding operations. Exemplary comminution apparatus for crushing includes, but is not limited to, jaw crushers, gyratory crushers, cone crushers, roll crushers and impact crushers. Exemplary comminution apparatus for grinding includes, but is not limited to, rod mills, ball mills, semi-autogenous (SAG) mills, arranged in a closed circuit with a classifier.

A 'comminution circuit' refers to one or more comminution apparatus in sequential combination together with auxiliary processing equipment such as hoppers, conveyors, feed chutes, discharge chutes, classifiers such as a screen classifier or a cyclone classifier, power generators, process controllers, process variable generators like such as level sensors and density gauges or pressure sensors to control flow of material through the comminution circuit and operation thereof, and so forth. Those skilled in the art will appreciate that components in the comminution circuit and their configuration will vary according to the plant capacity, ore characteristics (e.g. competency, grindability, abrasivity) and product size.

Various embodiments of a freely moving grinding media are illustrated in further detail with reference to FIGS. 1 and 2, where like parts are referred to with reference to like numerals throughout.

A freely moving grinding media 10 suitable for use in a rod mill is shown in FIG. 1. The freely moving grinding media 10 includes a conventional grinding rod 12 as typically used in a rod mill. The grinding rod 12 may be an alloy steel rod of any length and diameter. In many embodiments the grinding rod 12 may have a length in a range of 3.6 to 6.05 m and a diameter in a range of 75-100 mm. For example, grinding rods of diameter 75 mm, 90 mm or 100 mm are commonly employed in rod mills.

Each opposing end 14 of the grinding rod 12 is provided with a co-axially aligned bore 16. The bores 16 may be machined into the opposing ends 14 of the rod 12, or otherwise formed therein, to a depth of no more than 100 mm and a diameter of no more than 40 mm. In a preferred embodiment, the bore 16 is drilled into each opposing end 14 of the rod 12 to a depth of 80 mm with a diameter of 32 mm.

Figure 2:
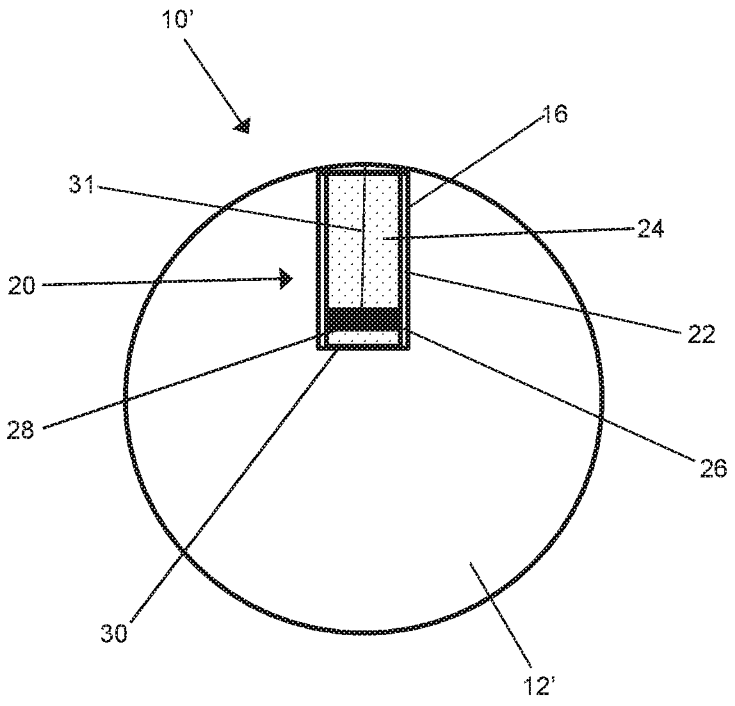
FIG. 2 is a cross-sectional view of an alternative embodiment of the freely moving grinding media.

An alternative freely moving grinding media 10' suitable for use in a ball mill or a SAG mill is shown in FIG. 2. The freely moving grinding media 10' includes a conventional grinding ball 12' as typically used in a ball mill or a SAG mill The grinding ball 12' may be an alloy steel or other iron-carbon alloy ball of any diameter. In many embodiments the grinding ball 12' may have a diameter in a range of 75-150 mm, although those skilled in the art will appreciate that grinding balls having smaller or larger diameters may be similarly adapted as described herein.

A bore 16 may be machined, or may be otherwise formed, into a circumferential surface 18 of the grinding ball 12' in radial alignment with a centre of the grinding ball 12' to a total depth of no more than 100 mm and a diameter of no more than 40 mm.

It will be appreciated that the depth of the bore 16 in the grinding ball 12' may vary depending on the diameter of the grinding ball 12'. For example, in one embodiment wherein the ball 12' is 250 mm diameter, the depth of the bore 16 is 85 mm. In an alternative embodiment wherein the ball 12' is 188 mm diameter, the depth of the bore 16 is 65 mm.

The freely moving grinding media 12, 12' includes a sensor body 20 configured to be received in the bore 16. The sensor body 20 includes a rigid sleeve 22, a resilient core 24 and a sensor array 26 embedded in the resilient core 24. The sensor array 26 may also be provided with a resilient housing 28.

The sensor array 26 may be disposed proximal a base 30 of the sensor body 20 so that, in use, the sensor array 26 is protected from collision with the charge and other grinding media 12, 12' and is not subject to wear during the life of the grinding media 12, 12'. The sensor array 26 may be provided with an antennae 31 extending from the sensor array 26 through the resilient core 24 to an upper surface 34 of the sensor body 20.

In some embodiments, the rigid sleeve 22 is configured to allow the sensor body 20 to be received in the bore 16 in a friction fit. The rigid sleeve 22 may be fabricated from any suitable rigid polymeric material such as polyethylene terephthalate (PET), high-density polyethylene (HDPE), polypropylene (PP), polycarbonates (PC), or polyvinyl chloride (PVC). The rigid sleeve 22 also rigidifies the grinding rod 12 or the grinding ball 12' against cracking or fracturing.

The resilient core 24 may comprise a first resilient material and the resilient housing 28 may comprise a second resilient material. The first and second resilient materials may be the same or different. The first and second materials may be capable of distributing forces applied to the sensor body 20 to said grinding body 12, 12', thereby disseminating at least some of said forces away from the sensor array 26.

The first and second resilient materials may be thermoplastic elastomers (TPE) or thermoset elastomers (TSE). Suitable examples of TPEs include, but are not limited to, styrenic block copolymers (TPS), thermoplastic polyolefinelastomers (TPO), thermoplastic vulcanizates (TPV), thermoplastic polyurethanes (TPU), thermoplastic copolyester (TPC), or thermoplastic polyamides (TPA). Suitable examples of TSEs include, but are not limited to, polyester resin, polyurethanes, vulcanized rubber, polyimides and bismaleimides, silicone resins, silicone rubber.

The sensor array 26 is arranged to measure one or more physical characteristics of a comminution apparatus during operation or a charge contained therein.

The sensor array 26 may include one or more sensors arranged to respectively measure one or more physical characteristics of the charge contained within the comminution apparatus, such as temperature, impact, impact frequency, impact velocity, impact force, disturbance, trajectory, charge volume, toe and shoulder of charge, and so forth.

Alternatively, or additionally, the sensor array 26 may comprise one or more sensors arranged to respectively measure one or more physical characteristics of the comminution apparatus such as lifter angle, lifter wear, temperature, rod tilt or scissoring, mill speed, energy efficiency, vibration amplitude and/or frequency, dynamic loading on liner bolt, liner bolt torque/tension, and so forth.

For example, the sensor array 26 may include a transducer capable of generating an electrical output signal such as voltage that varies according to impact force applied to the body in which the sensor array 26 is embedded. The sensor array 26 may comprise an array of transducers, wherein the signals generated by the transducers are combined. It will be appreciated that the sensor array 26 may include other piezoelectric sensors capable of generating an electrical output signal such as voltage that varies according to the compression, tensile and/or torque force applied to the body in which the sensor array 26 is embedded.

The sensor array 26 may comprise an accelerometer, such as a high G force accelerometer, capable of generating an electrical output signal such as voltage that varies in response to motion of the body in which the sensor array 26 is embedded. In particular, the accelerometer may be a three-axis MEMs-based gyroscopes, optionally incorporating a magnetometer to provide absolute angular measurements relative to the Earth's magnetic field. In this way, the trajectory and location of the sensor device 10 within the comminution apparatus may be collected.

The sensor array 26 may include an acoustic sensor capable of generating an electrical output signal such as voltage in response to impact frequency of the body in which the sensor array 26 is embedded.

The sensor array 26 may include a thermocouple capable of generating an electrical output signal such as voltage that varies according to the temperature of the body and/or the environment in which the body is located.

The sensor array 26 may further include an amplifier (not shown) that amplifies the electrical signals generated by the one or more sensors.

The one or more sensors may measure said one or more physical characteristics continuously or intermittently at a predetermined sampling frequency. The sensor array 26 may include a storage device (not shown), wherein data corresponding to said measurements may be stored. The one or more sensors may be further provided with a communications port for transferring collected data from said storage device to an external device. For example, the communications port may take the form of a serial communications port, a USB communications port or a wireless communications port. The wireless communications port may be a radio frequency (RF) wireless communications port comprising a transmitter and the antenna 31. The antenna 31 may be arranged to receive a RF signal from 920 MHz to 868 MHz.

The transmitter may be configured to transmit data directly from the one or more sensors in the sensor array 26 in real time or from the storage device to a processor of a processor module which will be described in more detail below.

In a further alternative embodiment, the freely moving grinding body may comprise a charge sample, such as a representative sample of an ore which is comminuted in the ball mill or the SAG mill. It will be appreciated that the representative sample of the ore may have a diameter in a range of 75-150 mm or be of a sufficient size so that the bore 16 may be drilled into said sample without fracturing said sample. Similarly, the sample of ore should have a suitable mineralogy (e.g. morphology, hardness, cleavage and so forth) so that said sample is sufficiently robust in the mill for a predetermined period of time in order for the sensor body 20 to be retained therein to measure and collect a desired number of data points.

Figure 3:
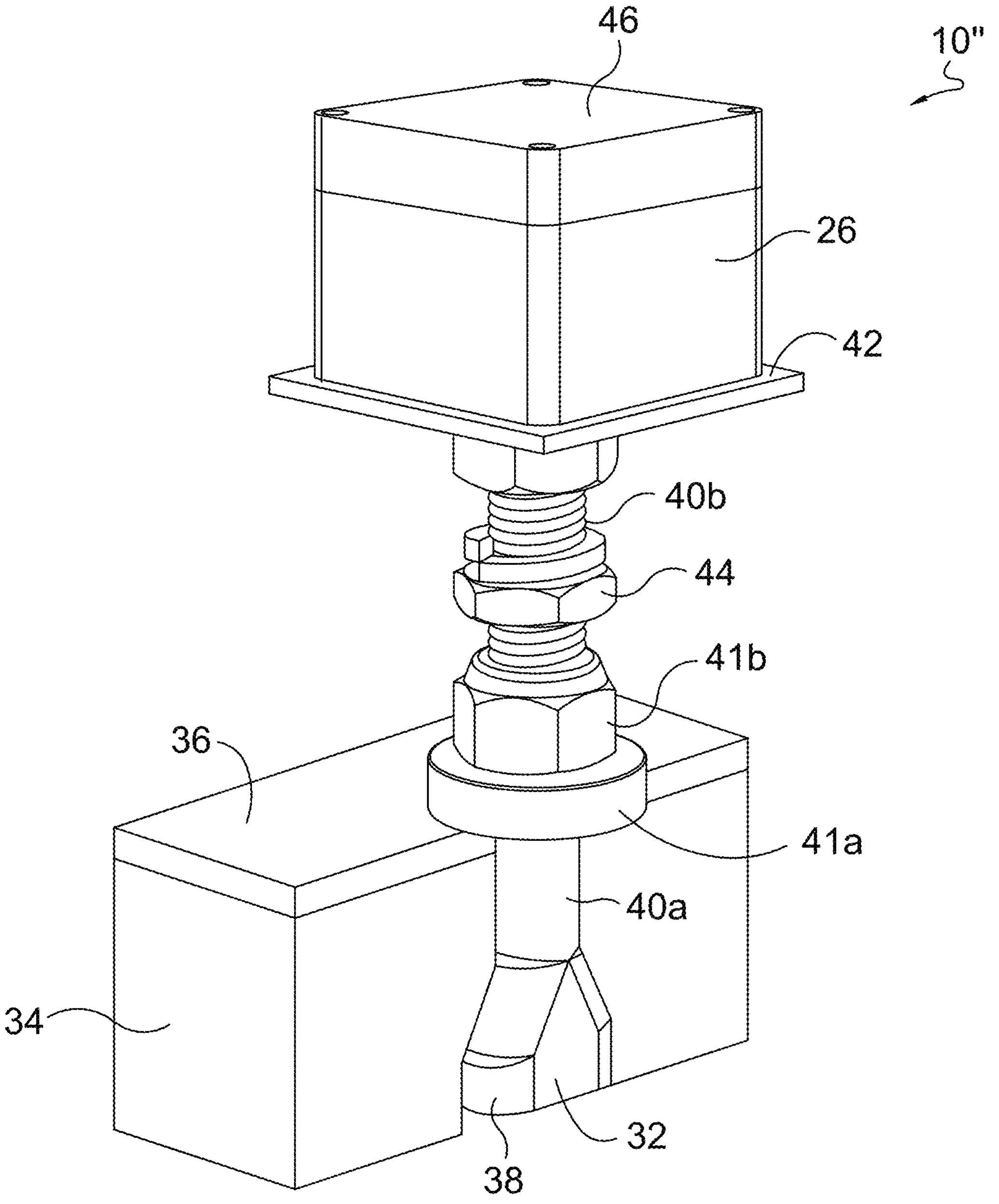
FIG. 3 is a cross-sectional representation of an alternative sensor device as disclosed herein.

Referring now to FIG. 3, an alternative embodiment of a sensor device 10" is illustrated, where like parts are referred to with reference to like numerals throughout. The sensor device 10" may be suitable for use in a rod mill, ball mill and SAG mill in which sacrificial wear liners are employed. The sensor device 10" includes a conventional liner bolt 32 as typically used to fasten a sacrificial wear liner 34 to the wear plate or mill shell 36 of a corresponding comminution apparatus.

In this particular embodiment, the liner bolt 32 includes a head 38 extending from a threaded shank 40. In use, the head 38 and a portion 40*a* of the threaded shank 40 from which it extends, are disposed in an aperture in the wear liner 34 and the wear plate 36. A free portion 40*b* of the threaded shank 40 which is distal from the head 38 externally protrudes from the mill shell 36, as shown in FIG. 3. The sensor device 10" may optionally be provided with a sealing washer 41*a* which is recessed to suit the liner bolt 32 and a lock nut 41*b* as shown in FIG. 3.

The sensor device 10" also includes a mounting plate 42 which may be threadably coupled to the free portion 40*b* of the threaded shank 40 by means of a lock nut and helical spring washer 44. The sensor array 26, as described above, may be mounted on the mounting plate 42. It is envisaged that the sensor array 26 may be disposed in a suitable housing 46 to protect the sensor array 26 from damage and interference from material external to the mill shell 36.

The sensor device 10" may operate independently from the freely moving grinding media 10, 10' within the comminution apparatus and measure one or more physical characteristics relating to operation thereof. For example, in embodiments where the sensor array 26 comprises an accelerometer, in particular a high G accelerometer, the sensor array 26 associated with the sensor device 10" may measure and collect data relating to impact forces experienced by the mill shell 36, a vibration profile from feed to discharge end and mill rotation speed and angle.

Alternatively, or additionally, data collected and stored by the sensor array 26 of the sensor device 10" may be used in conjunction with data collected by freely moving grinding media 10, 10' within the comminution apparatus for the purposes of cross referencing one or more physical characteristics, such as sampling time and location within the comminution apparatus.

System and Method for Optimising Performance of a Comminution Circuit

The present disclosure also relates to a system and method for optimising performance of a comminution circuit comprising a comminution apparatus in response to one or more physical characteristics of the comminution apparatus or the charge contained therein measured during operation of the comminution apparatus.

Figure 4:
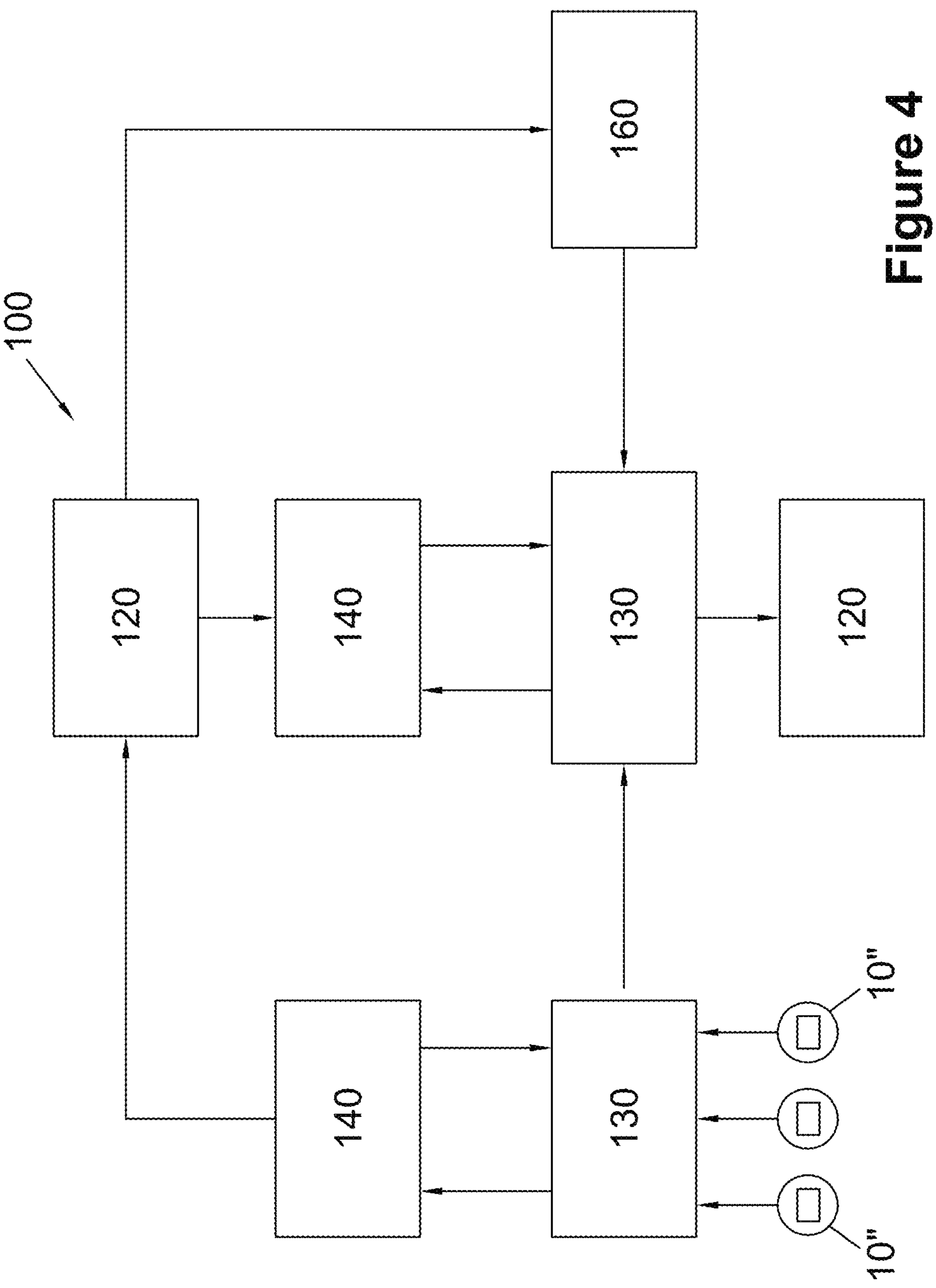
FIG. 4 is a block diagram representing one embodiment of an optimisation method and system where embodiments of the freely moving grinding media disclosed herein are employed.

Referring now to FIG. 4, the system 100 may be arranged to provide real time or near real time information to a mine control system 110 through process operator and/or metallurgist 160 to operate the comminution circuit and optimise one or more process parameters of the comminution circuit in accordance with a process model 120. The mine control system 110 may include any suitable computerised control system for a comminution process or a comminution circuit comprising a large number of control loops, in which autonomous controllers are distributed throughout the mine control system 110 in communication with a central operator supervisory controller, such as a distributed control system (DCS) and/or a programmable logic controller (PLC) and/or a supervisory control and data acquisition (SCADA).

The process model 120 comprises a time-series format to identify conditions that lead to optimal performance of the comminution apparatus. Generally, the process model 120 may include a holistic approach, taking into account a plurality of process parameters as listed below, although it will be appreciated that the following list may not be exhaustive and may include additional process parameters. It will be appreciated that the process model 120 may vary for different sites.

The one or more process parameters of the process model 120 may be selected from a group comprising temperature of the comminution apparatus or the charge; impact force, impact frequency, disturbances, tilt, ore/material feed rate; water flow rate; mill speed; energy efficiency; trajectory, mill filling, monitoring toe of charge, lifter angle, degree of wear on lifter, consumption of grinding media; particle size distribution; recirculating load; pH, slurry density, specific gravity; bearing pressure and/or temperature; discharge rate; bolt torque/tension measurement; dynamic loading on the bolt, position mapping of the bolts, pebble port and grate wear measurement.

Certain process parameters, such as temperature of the comminution apparatus or the charge, impact force, impact frequency, charge disturbances and tilt may be measured by the freely moving grinding media 10, 10' or the sensor device 10". Other process parameters, such as ore/material feed rate, water flow rate, mill speed, recirculating load, pH, slurry density, specific gravity, bearing pressure and/or temperature, discharge rate may be obtained from the DCS/PLC. Some process parameters, such as energy efficiency, trajectory, mill filling, monitoring toe of charge, lifter angle, degree of wear on lifter, consumption of grinding media may be calculated using historical process data of the plant.

The system 100 may also include a first processor module 130 which in this embodiment comprises a computing module which may be standalone (such as a server) or may be a module, such as a remote terminal unit (RTU) within a larger multifunction computing system. The server or computing module may be located locally to the comminution circuit or connected remotely to the comminution circuit via a telecommunication connection.

The first processor module 130 may comprise suitable components necessary to receive, store and execute appropriate computer instructions. The first processor module 110 may include a processing unit, read-only memory (ROM), random access memory (RAM), and communication input/output devices such as disk drives, input devices such as an Ethernet port, a USB port, and so forth, a display such as a liquid crystal display, a light emitting display or any other suitable display including a touch sensitive interactive display, and communication links.

The first processor module 130 may include instructions that may be contained in ROM, RAM or disk drives and may be executed by the processing unit. There may also be a plurality of communication links which may connect to one or more computing devices such as a server, personal computers, terminals, wireless or handheld computing devices, and/or proprietary control interfaces. At least one of a plurality of communications links may be connected to an external computing network through a telephone line or other type of communications link.

The first processor module 130 may further include storage devices such as a disk drive which may encompass solid state drives, hard disk drives, optical drives or magnetic tape drives. The first processor module 110 may use a single disk drive or multiple disk drives.

In some embodiments, the first processor module 130 may optionally be in communication with a cloud computing system 140 for storage and processing data received from the one or more sensor arrays 26.

The first processor module 130 may also have a suitable operating system which resides on the disk drive or in the ROM of the server or computing module.

Figure 5:
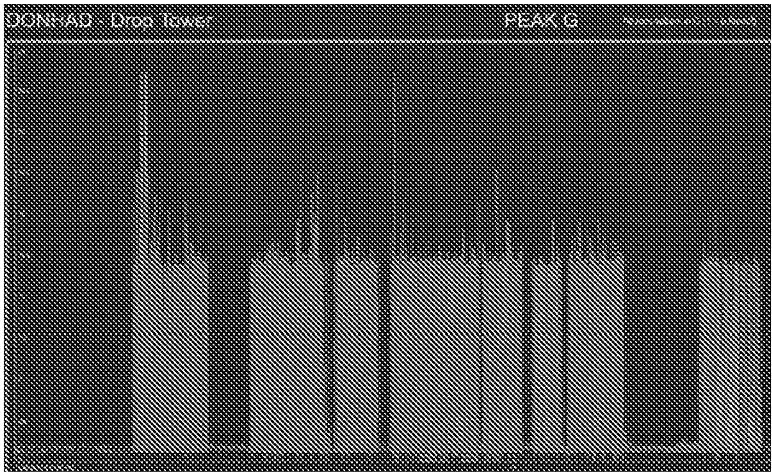
FIG. 5 is a graphical representation of data collected from accelerometers embedded within freely moving grinding media in accordance with one embodiment as described herein.
Figure 6:
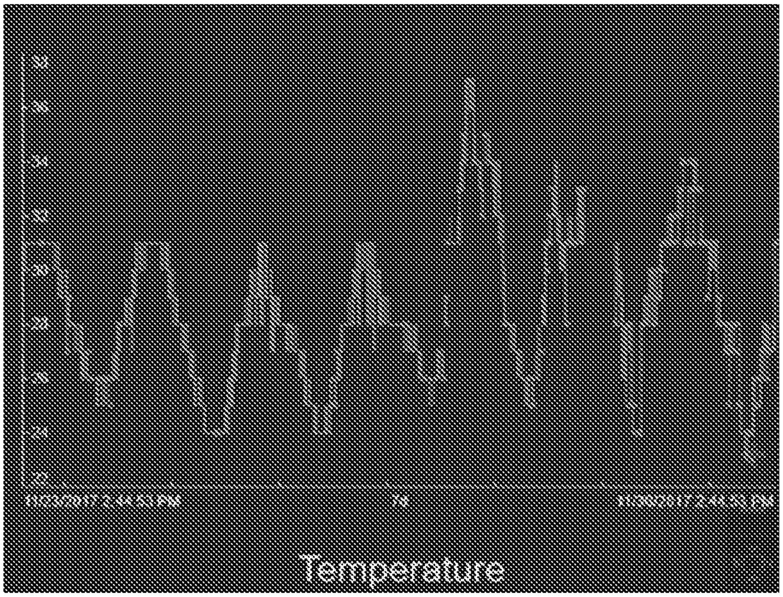
FIG. 6 is a graphical representation of temperature measured by thermocouple embedded within freely moving grinding media in accordance with another embodiment as described herein.

In this embodiment, the first processor module 130 is provided with a receiver arranged to receive data from the freely moving grinding media 10, 10' or the sensor device 10" relating to one or more physical characteristics in real time to conduct a real time analysis of operational performance of a comminution apparatus in a comminution circuit. A pre-installed program may be used by the processor module to convert the received data into sensor variables SV1, SV2, . . . SVn (e.g. temperature, impact force and/or impact frequency, disturbance, trajectory, lifter angle and so forth) and to provide graphical representations of such sensor variables SV1, SV2, . . . SVn. For example, FIGS. 5 and 6 show respective graphical representations of sensor variables for impact force and temperature, respectively, derived from data received from respective freely moving grinding media 10'.

Figure 7:
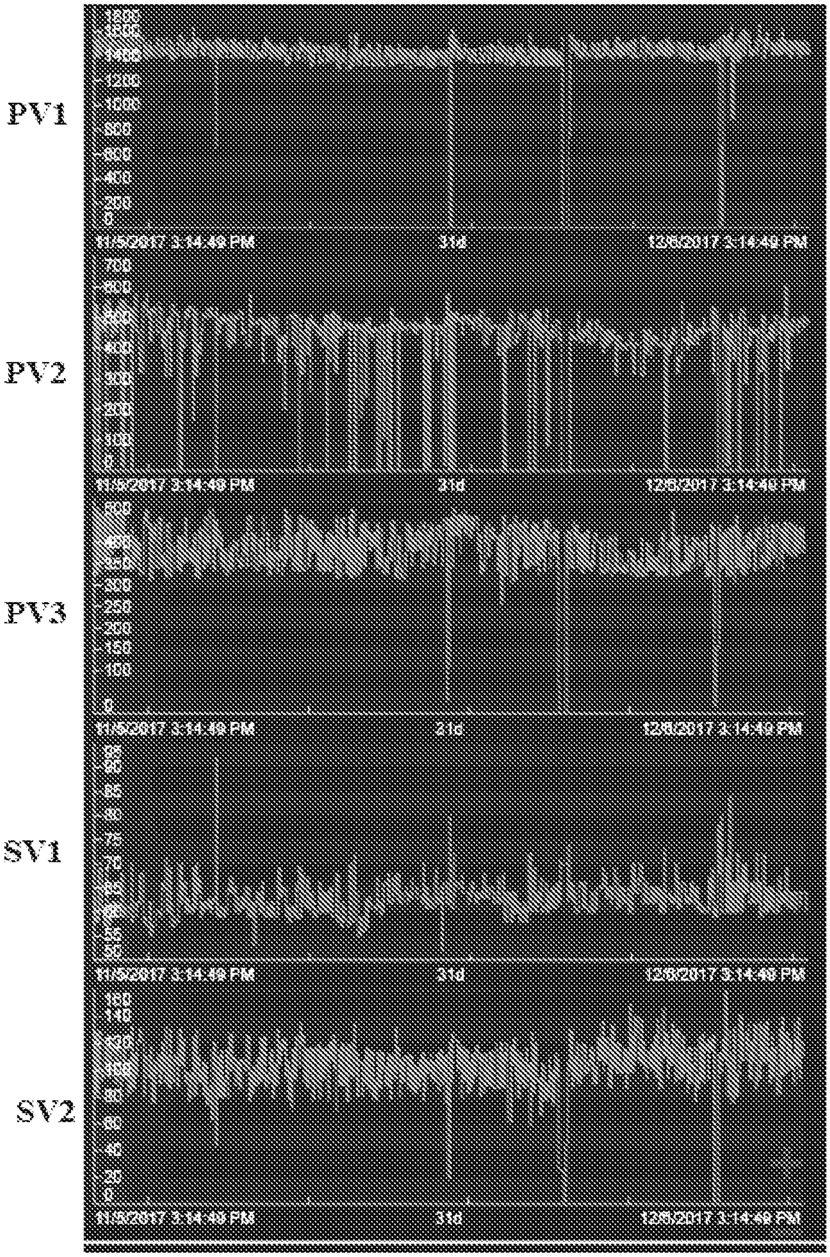
FIG. 7 is a graphical representation of real time data monitoring of process variables PV1, PV2, PV3 and sensor data SV1, SV2.

In one embodiment, the sensor variables SV1, SV2, . . . SVn may be passed to the mine control system 110 in real time in the absence of any optimisation information to provide real time monitoring of the performance of the comminution apparatus. The sensor variables SV1, SV2, . . . SVn may be compared with one or more process parameters PV1, PV2, . . . PVn, in particular by graphical representation, to identify one or more real-time interactions between the process variables of the comminution circuit and the sensor variables. FIG. 7 shows an example of real time data monitoring as displayed on a HMI where process parameters PV1, PV2 and PV3 are represented graphically with sensor variables SV1 and SV2. Visualisation of such data provides an indication of the response of conditions within the comminution apparatus to any change in one or more broader process conditions in the comminution circuit.

In another embodiment shown in FIG. 4, the system 100 may also include a optimisation system 150 to receive and process the real time analysis generated by the first processor module 130 derived from sensor variables SV, process variables PV and to general real time or near real time control variables CV for the plant operator/metallurgist 160 and update the process model 120. The optimisation system 150 is arranged in communication with the mine control system 110, the process model 120 and the first processor module 130. The optimisation system 150 acquires sensor variables SV1, SV2, . . . SVn from the first processor module 130 and other process data from the mine control system 110, and conducts a real time analysis of the operation of the comminution apparatus in the comminution circuit. In one embodiment, the optimisation system 150 may generate an updated process model 120' in accordance with the real time analysis, whereby the one or more process parameters may be varied to improve the performance of the comminution circuit in real time or near real time. In particular, the optimisation system 150 may generate a set of optimised process parameters to optimise operation of the comminution circuit.

It is to be noted that, in generating the updated process model 120', one or more algorithms may be used by the optimisation system 150 which employ mathematical and statistical modelling on collected data from data relating to prior operation of the comminution apparatus. This mathematical modelling may include suitable interpolation techniques or other mathematical techniques such as non-linear multivariable regression or auto-regressive integrated moving average (ARIMA) time series model or neural network modelling.

Figure 8:
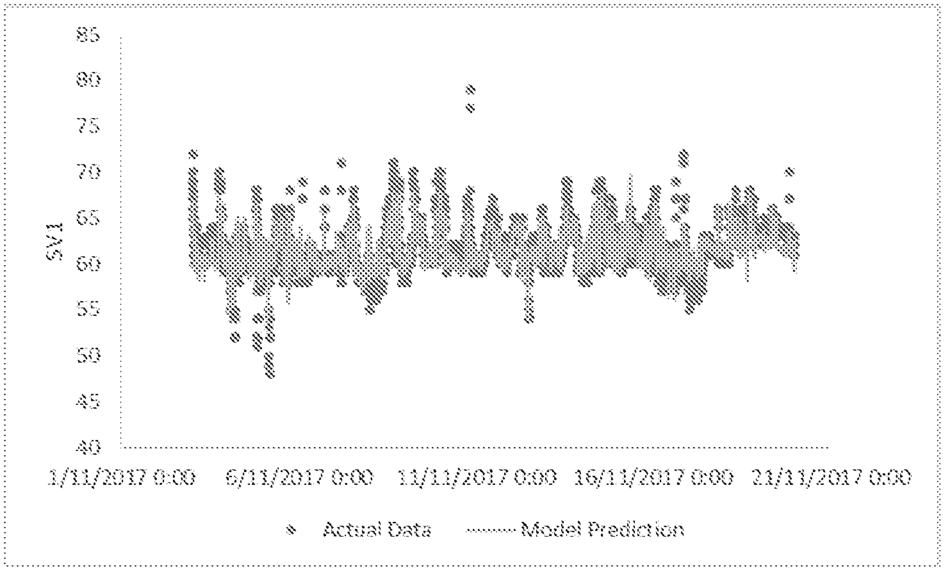
FIG. 8 are respective graphical representations of comparisons between measured data collected by a first freely moving grinding media (SV1) and a second freely moving grinding media (SV2) and a predicted process model.
Figure 8:
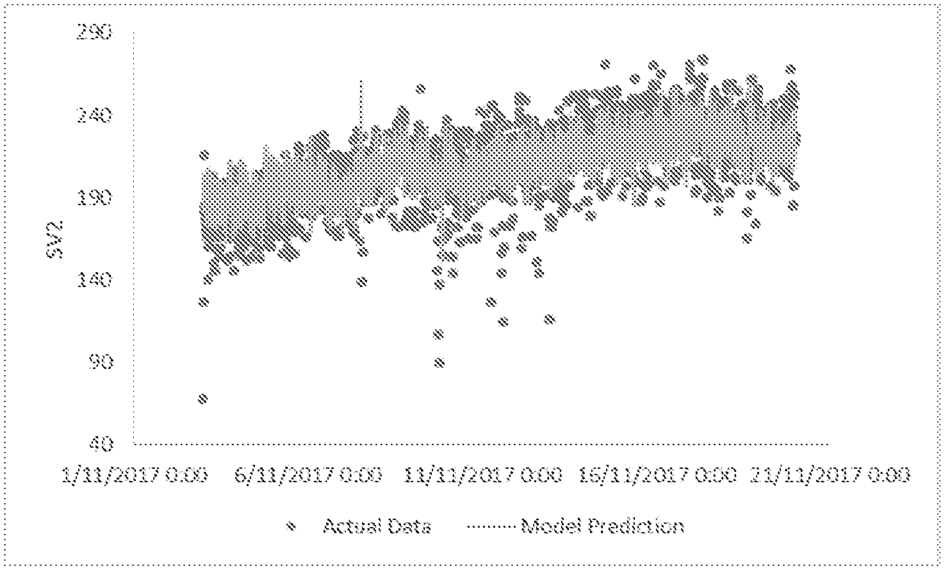

For example, statistical process models may be developed by employing one or more process parameters PV1, PV2, . . . PVn employed in the comminution circuit and sensor variables SV1, SV2, . . . SVn measured by the freely moving grinding media 10, 10' or the sensor device 10" which can be utilised to optimise the comminution process and develop one or more control variables (CV) set points in the mine control system 110. It will be appreciated that the model features will vary depending on the specific comminution circuit of any particular site. Preferably, the model factors in most if not all the aspects of the comminution process as recorded in a particular site. FIG. 8 shows the accuracy of a process model 120' for predicting sensor variables SV1 and SV2 corresponding to the process parameters PV1, PV2, PV3 as shown in FIG. 8.

Figure 9:
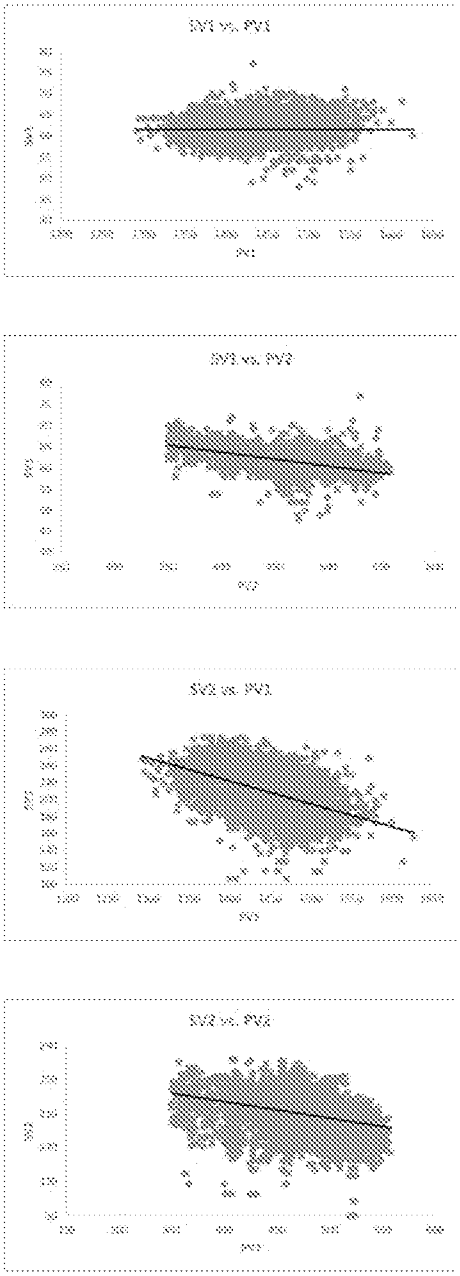
FIG. 9 are respective graphical representations of several trend analyses between process variables PV1, PV2 and measured data collected by first and second freely moving grinding media (SV1, SV2)

Trend analysis relating process parameters PV and sensor variables SV may also be calculated, as shown in FIG. 9, to develop a comprehensive picture of the internal dynamics of the comminution apparatus and its relationship to the response of the freely moving grinding media 10, 10' and the sensor device 10" in situ.

Figure 10:
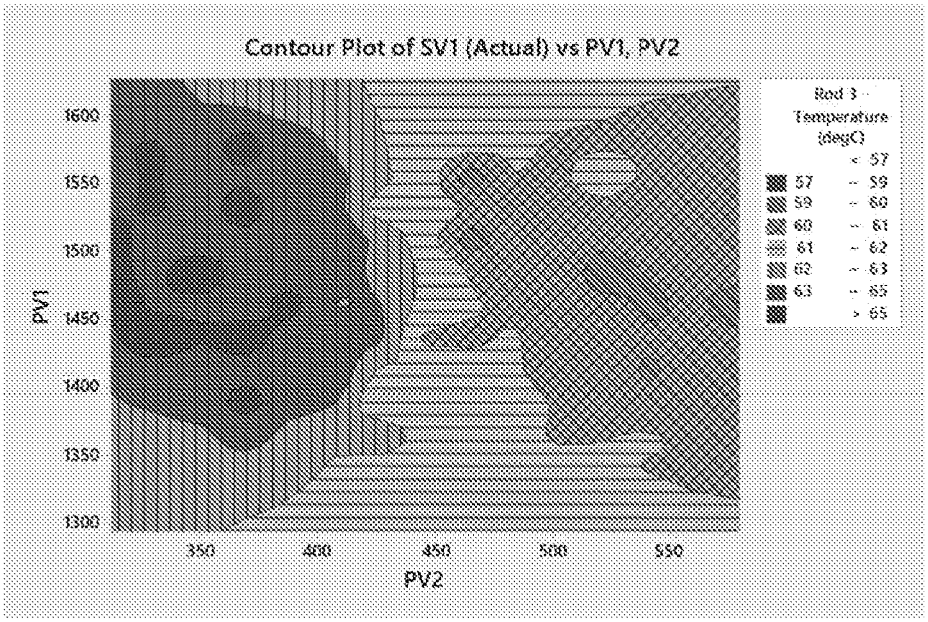
FIG. 10 are contour plots of process data and model predictions for process variables PV1, PV2 in respect of sensor data SV1.
Figure 10:
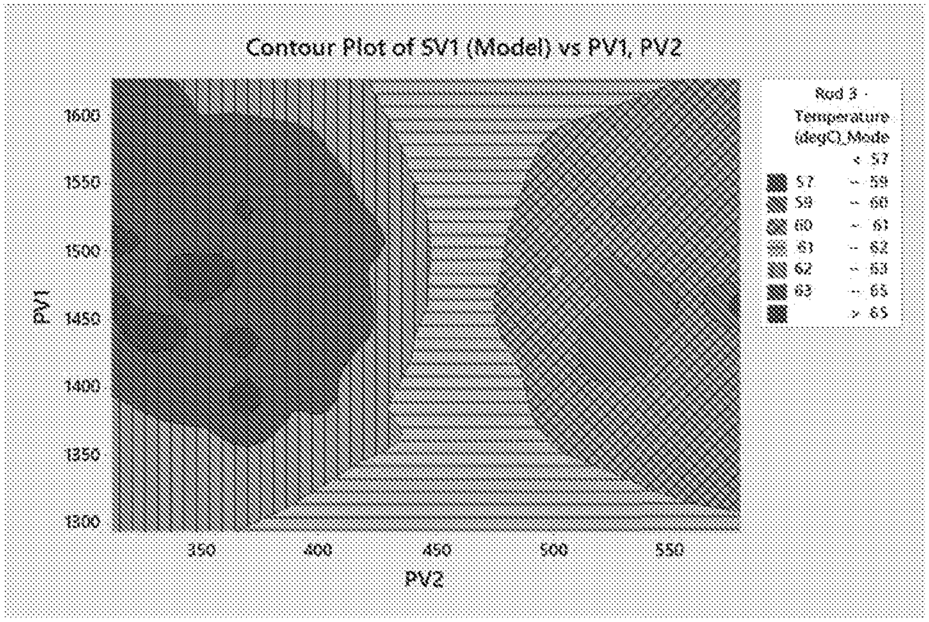
Figure 11:
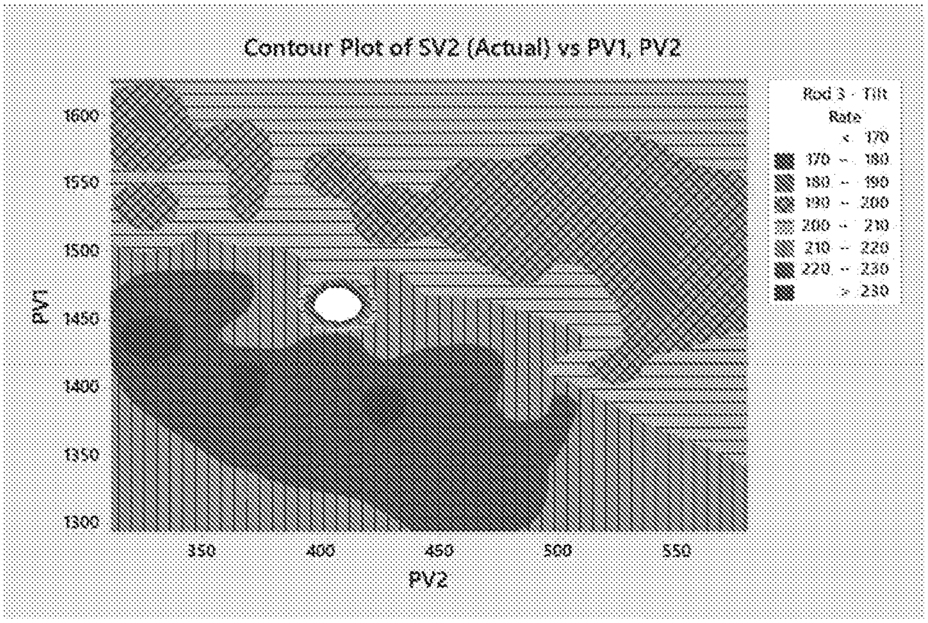
FIG. 11 are contour plots of process data and model predictions for process variables PV1, PV2 in respect of sensor data SV2
Figure 11:
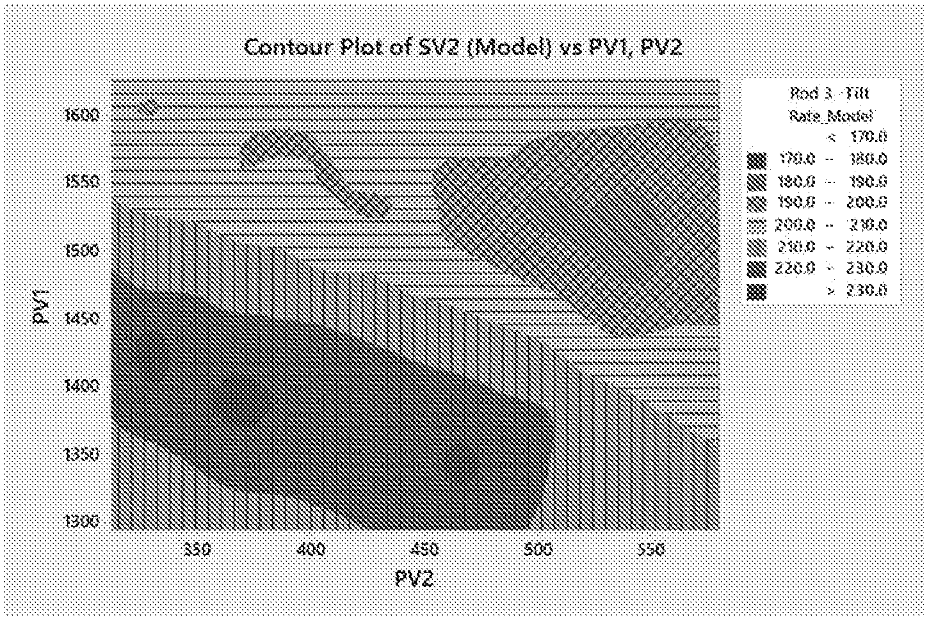

Contour plots of the process parameters and model predictions in form development of optimization algorithms for the comminution process. As shown in FIGS. 10 and 11, 2D-contour plots can provide a clear indication of optimised value for the process parameters of the comminution process. For example, for the lowest value of SV1 and SV2, the corresponding process parameter PV1 and PV2 may be identified by utilizing the statistical updated process model 120' as described above.

In alternative embodiments, sensor variables SV1, SV2, . . . SVn from the first processor module 130 may be converted to a real time analysis of the operation of the comminution apparatus in the cloud computing system 140. The real time analysis so generated may be in the form of a report, data set or other readable format and sent to, and considered by, an operator 160, such as a metallurgist or a plant operator, together with the process model 120. On the basis of the real time analysis, the operator 160 may manually vary one or more process parameters to improve the performance of the comminution circuit thereby updating the process model 120 to generate an updated process model 120'.

The one or more process parameters that may be varied to improve operational performance of the comminution circuit in response to the real time analysis of the comminution apparatus may be selected from a group comprising temperature of the comminution apparatus or the charge; impact force, impact frequency, disturbances, tilt, ore/material feed rate; water flow rate; mill speed; energy efficiency; trajectory, mill filling, monitoring toe of charge, lifter angle, degree of wear on lifter, consumption of grinding media; particle size distribution; recirculating load; pH, slurry density, bearing pressure and/or temperature; discharge rate; bolt torque/tension measurement; dynamic loading on the bolt, position mapping of the bolts. In particular, process parameters such as solids feed rate, water flow rate, mill filling, power, mill speed, slurry density, discharge rate are the parameters that may ye varied to improve operational performance of the comminution circuit.

It is an advantage of the described embodiments of the disclosure that a method and system are provided which facilitate real time updating of a comminution process model to assist in optimising performance of the comminution circuit. Hence, the likelihood of overgrinding is reduced. This results in increased recovery of material with a target product size and throughput with resultant improved economics associated with energy efficiency.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

For example, although not required, the embodiments described with reference to FIGS. 4-11 can be implemented as an application programming interface (API) or as a series of libraries for use by a developer or can be included within another software application, such as a terminal or personal computer operating system or a portable computing device operating system. Generally, as program modules include routines, functions, objects, components and data files, the skilled person will understand that the functionality of the software application may be distributed across a number of routines, functions, objects, components or data files to achieve the same functionality.

It will also be appreciated that were the methods and systems of the present invention implemented by a computing system or partly implemented by computing systems then any appropriate computing system architecture may be utilised. This includes stand alone computers, networked computers and/or dedicated computing devices which may perform multiple functions, some functions being unrelated to the invention described herein. For example, the comminution circuit may include computerized functions such as error handling, movement control or communication systems which are integrated or programmed to operate with comminution methodologies described herein as a complete software package. Where the terms "computer", "computing system" and/or "computing device" are used, these terms are intended to cover any appropriate arrangement of computer hardware for implementing the functionality or software described.

EXAMPLES

The following examples are to be understood as illustrative only. They should therefore not be construed as limiting the invention in any way.

Figure 12:
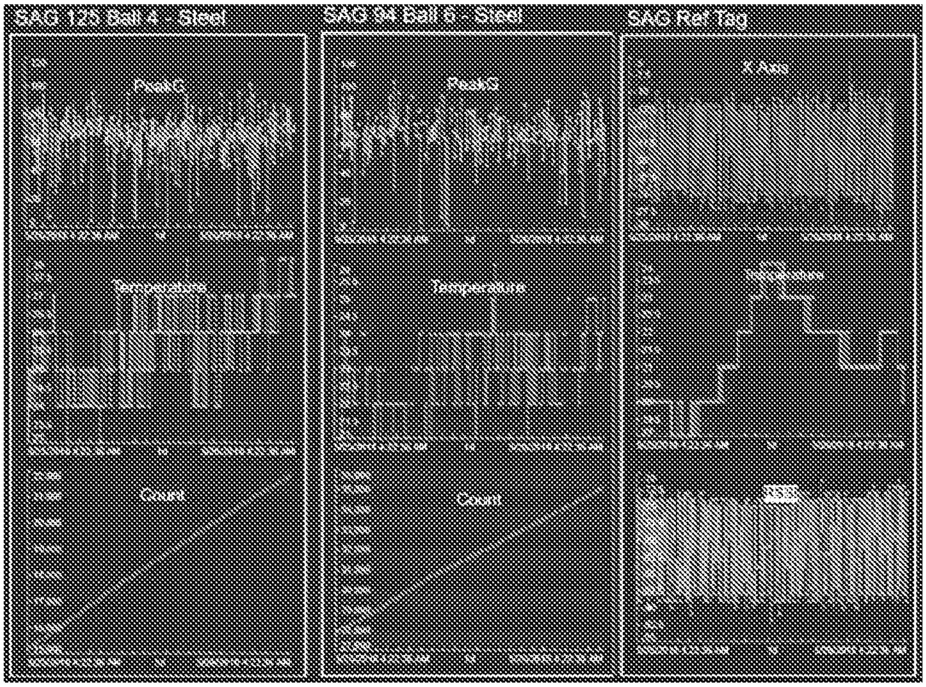
FIG. 12 is a graphical representation of peak G-force, temperature and number of impacts measured by freely moving grinding media of two different diameters in a SAG mill in accordance with one embodiment as described herein.

Ten (10) freely moving grinding media 10' in the form of grinding balls 12' having a diameter of 94 mm and 125 mm, respectively, were loaded into an operating SAG mill. Data relating to three (3) physical parameters: (1) peak G-force, (2) temperature and (3) number of impacts, were collected from the respective sensor arrays 26 of each different sized grinding ball 12' and are plotted in FIG. 12. Despite the difference in diameter, the collected data implies no differences between the two grinding balls 12' pathways in the charge, with the 94 mm grinding ball 12' experiencing similar G-force impact events as the larger 125 mm grinding ball 12'. Both sized grinding balls 12' also saw similar count of 7000 impacts over the same period.

Figure 13:
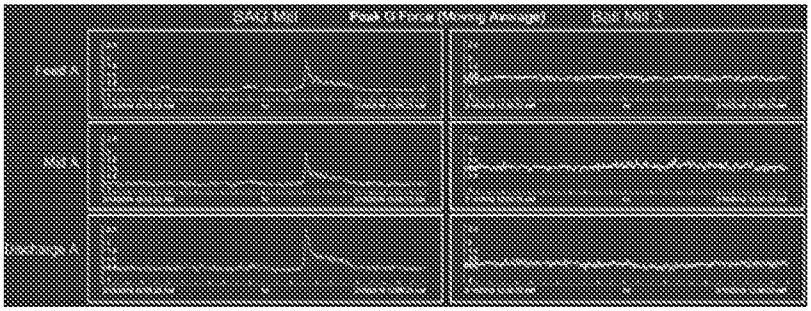
FIG. 13 is a graphical representation of peak G-force measured in real time in a SAG mill and a ball mill.

FIG. 13 shows peak G-force data measured by freely moving grinding media 10' in a SAG mill and a ball mill. The similarity of the signals from said grinding media 10' within each mill indicates a robust and reliable output of data from said grinding media 10', with a period of instability in the SAG mill clearly displayed by the measured data.

It is possible to predict the charge motion in a mill by using Discrete Element Method (DEM) based simulations.

DEM models the motions and interactions of a set of individual particles and moving walls, as affected by gravity, using mathematical algorithms and Newton's Laws of Motion. Whilst DEM modelling is useful, one must also be mindful of its considerable limitations. By way of specific example, the DEM model is a point of time analysis. That is, it provides insight into inter-particle behaviour at the time the relevant data is collected. The model also requires critical variable assumptions to be made to conduct the analysis. A typical analysis is time consuming. Given the dynamics of the system elements in the tumbling mill, one cannot say the study is typical or repetitive at another point of time. For this to be so multiple simulations in a longitudinal study need to be undertaken.

Using point of time study outcomes such as those described hereon, DEM models and real time data allows for triangulation of results. Triangulation is a powerful technique that facilitates validation of data through cross verification from two or more sources. Accordingly, triangulation of DEM models and real time data measured by the grinding media 10, 10' as described herein may be utilised to improve mill optimization.

Figure 14:
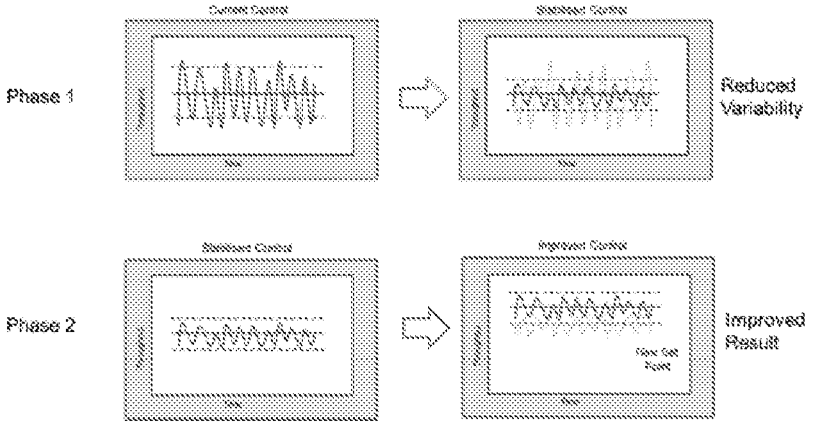
FIG. 14 is a block diagram representing another embodiment of an optimisation method where embodiments of the freely moving grinding media disclosed herein are employed.

In Phase 1 of this optimisation model, as shown in FIG. 14, a base case of operating performance is established from pre-existing SCADA data. A point of time study is then undertaken to ensure ball size, ball charge, and other critical mill parameters are optimized (Phase 2). Real time data from the sensor system then monitors mill events and helps ensure the mill is operating within modelled parameters more often (Phase 3). Thus, throughput and mill efficiency may be iteratively improved (Phase 4).

The invention claimed is:

1. A grinding media configured to measure one or more physical characteristics during a comminution process, said grinding media comprising:

a grinding body with a bore disposed in an outer portion of said body and a sensor body received in the bore in a friction fit, wherein the sensor body comprises a rigid sleeve, a resilient core and a sensor array embedded in the resilient core.

2. The grinding media according to claim 1, wherein the sensor array is disposed proximal a base of the sensor body.

3. The grinding media according to claim 1, wherein the sensor array is provided with an antennae extending from the sensor array through the resilient core to an upper surface of the sensor body.

4. The grinding media according to claim 3, wherein the sensor array is provided with a resilient housing.

5. The grinding media according to claim 4, wherein the resilient core includes a first resilient material and the resilient housing includes a second resilient material.

6. The grinding media according to claim 5, wherein the first and second resilient materials are the same or different.

7. The grinding media according to claim 1, wherein the resilient core distributes forces applied to the sensor body to the grinding body, thereby disseminating at least some of said forces away from the sensor array.

8. The grinding media according to claim 1, wherein the grinding body comprises a grinding rod having opposing ends.

9. The grinding media according to claim 8, wherein the bore is co-axially disposed in one or each opposing end of the grinding rod.

10. The grinding media according to claim 1, wherein the grinding body comprises a grinding ball.

11. The grinding media according to claim 10, wherein the bore is radially aligned with a center of the grinding ball.

12. The grinding media according to claim 11, wherein the bore extends to a center of the grinding ball.

13. The grinding media according to claim 1, wherein the grinding body comprises a representative sample of a charge when placed in a comminution apparatus.

14. The grinding media according to claim 13, wherein the sensor array comprises one or more sensors arranged to respectively measure one or more physical characteristics of the charge during a comminution process, and wherein the one or more physical characteristics being measured include at least one of temperature, impact, impact frequency, impact velocity, impact force, disturbance, trajectory, charge volume, toe or shoulder of charge.

15. The grinding media according to claim 1, wherein the sensor array comprises one or more sensors arranged to respectively measure one or more physical characteristics during a comminution process, and wherein the one or more physical characteristics being measured include at least one of lifter angle, lifter wear, temperature, rod tilt or scissoring, mill speed, energy efficiency, vibration amplitude and/or frequency, dynamic loading on liner bolt, or liner bolt torque/tension.

16. A system configured for optimizing performance of a comminution circuit comprising a comminution apparatus in response to one or more physical characteristics of the comminution apparatus or a charge contained therein measured during operation of the comminution apparatus, the system comprising:

a plurality of measuring grinding media each having a grinding body with a bore disposed in an outer portion of said body and a sensor body received in the bore in a friction fit, wherein the sensor body comprises a rigid sleeve, a resilient core and a sensor array embedded in the resilient core, the measuring grinding media placed freely movable within the comminution apparatus wherein during operation of the comminution apparatus they will be mixed with an ore in need of comminution and a plurality of non-measuring grinding media and charged to the comminution apparatus, whereby, during operation of the comminution apparatus, the plurality of measuring grinding media collect data corresponding to one or more physical characteristics of the comminution apparatus or the charge contained therein during operation of the comminution apparatus;

a processing module arranged to receive collected data from the plurality of measuring grinding media to conduct a real time analysis of the operation of the comminution apparatus in the comminution circuit;

and an optimization system arranged to monitor and report on one or more performance characteristics of the comminution circuit while the comminution circuit is operating in accordance with a process model, the optimization system being further arranged to vary one or more process parameters in accordance with the real time analysis provided by the processing module to improve the performance of the comminution circuit and thereby update the process model.

17. The system according to claim 16, wherein the optimization system is arranged to generate a set of optimized process parameters to optimize the one or more performance characteristics of the comminution circuit.

18. The system according to claim 16, wherein the one or more process parameters is manually varied by an operator.

19. The system according to claim 16, wherein the optimization system is arranged to vary the one or more process parameters in accordance with said real time analysis in real time or near real time.

20. The system according to claim 16, wherein the optimization system is arranged to vary the one or more process parameters in accordance with said real time analysis to obtain optimized performance of the comminution circuit.

* * * * *